(12) United States Patent
Batten et al.

(10) Patent No.: US 9,819,182 B1
(45) Date of Patent: Nov. 14, 2017

(54) SYSTEMIC OPTIMIZATION OF PHOTOVOLTAIC APPARATUS

(75) Inventors: Robert Batten, Tualatin, OR (US); Ravindranath Naiknaware, Portland, OR (US)

(73) Assignee: SunPower Corporation, San Jose, CA (US)

( * ) Notice: Subject to any disclaimer, the term of this patent is extended or adjusted under 35 U.S.C. 154(b) by 751 days.

(21) Appl. No.: 13/005,482

(22) Filed: Jan. 12, 2011

Related U.S. Application Data (60) Provisional application No. 61/294,464, filed on Jan. 12, 2010.

(51) Int. Cl.
| | | |
|---|---|---|
| *H02J 1/00* | (2006.01) | |
| *H02J 3/00* | (2006.01) | |
| *H02J 1/10* | (2006.01) | |
| *H02J 3/38* | (2006.01) | |

(52) U.S. Cl.
CPC ............... *H02J 1/102* (2013.01); *H02J 3/38* (2013.01); *Y10T 307/707* (2015.04)

(58) Field of Classification Search
CPC ........................................................ H02J 1/00
USPC ........................................................ 307/82
See application file for complete search history.

(56) References Cited

U.S. PATENT DOCUMENTS

| | | | |
|---|---|---|---|
| 6,800,964 B2 | 10/2004 | Beck | |
| 7,999,519 B2* | 8/2011 | McDonald et al. | 323/238 |
| 2003/0047209 A1* | 3/2003 | Yanai et al. | 136/291 |
| 2009/0284240 A1* | 11/2009 | Zhang et al. | 323/285 |
| 2009/0284998 A1* | 11/2009 | Zhang et al. | 363/55 |
| 2010/0109442 A1* | 5/2010 | Vega Betoret et al. | 307/82 |
| 2010/0147354 A1* | 6/2010 | Takehara | H02J 3/383 |
| | | | 136/244 |
| 2011/0025130 A1* | 2/2011 | Hadar | H01L 31/02021 |
| | | | 136/244 |
| 2012/0068547 A1* | 3/2012 | Vermeersch et al. | 307/82 |
| 2013/0241294 A1* | 9/2013 | Cleland | H02J 3/383 |
| | | | 307/71 |

* cited by examiner

*Primary Examiner* — Rexford Barnie
*Assistant Examiner* — Toan Vu
(74) *Attorney, Agent, or Firm* — Grasso PLLC (57) ABSTRACT

A photovoltaic system may include a first photovoltaic component having local power optimization functionality to process power at a first level, a second photovoltaic component to process power at a second level, and optimization logic to command the first photovoltaic component to accommodate system-level power optimization. The first component may be reconfigurable to accommodate the system-level optimization. The entire system may be dynamically reconfigured to continuously operate at the highest overall level of system efficiency.

17 Claims, 8 Drawing Sheets

SYSTEMIC OPTIMIZATION OF PHOTOVOLTAIC APPARATUS

CROSS-REFERENCE TO RELATED APPLICATIONS

This application claims priority from U.S. Provisional Patent Application Ser. No. 61/294,464 titled Systemic Optimization of Solar Arrays filed Jan. 12, 2010.

BACKGROUND

Photovoltaic (PV) systems typically include components having local power optimization features. For example, PV panels may be equipped with local power optimizers that perform DC-to-DC conversion with maximum power point tracking (MPPT) to keep the panel operating at its peak power level. Likewise, a centralized inverter may also include an MPPT algorithm that is designed to optimize the operating level of the PV array as seen from the inverter.

DETAILED DESCRIPTION

Systemic Optimization

As discussed above, photovoltaic (PV) systems typically include components having local power optimization features. However, having a component that is locally optimized from its own perspective may not actually cause the entire system to operate at overall peak efficiency. Moreover, uncoordinated local optimization may fail to take into account real world effects such as temperature changes, shading issues, panel mismatches, and inverter efficiency curves.

For example, a PV array may have several strings of PV panels where each panel includes a local power optimizer. The combined outputs from the locally optimized panels may provide a certain voltage and current to a centralized inverter. Depending on its efficiency curve, however, the inverter may be operating substantially below its peak efficiency level. According to some inventive principles of this patent disclosure, the operating points of the local power optimizers may be moved away from their local maximum points to provide a combined voltage and current that enable the centralized inverter to operate at a higher efficiency level. Depending on the implementation details, a large increase in the efficiency of the inverter may more than compensate for smaller efficiency reductions at the panels.

This is just one example of the inventive principles of this patent disclosure which involve a systemic approach to power optimization wherein the operation of components at multiple levels are adjusted to provide better overall system-level optimization. This patent disclosure includes numerous example methods and apparatus for illustrating the systemic power optimization principles. The inventive principles, however, are not limited to these examples. Moreover, the inventive principles may be combined to provide additional synergistic solutions.

Figure 1:
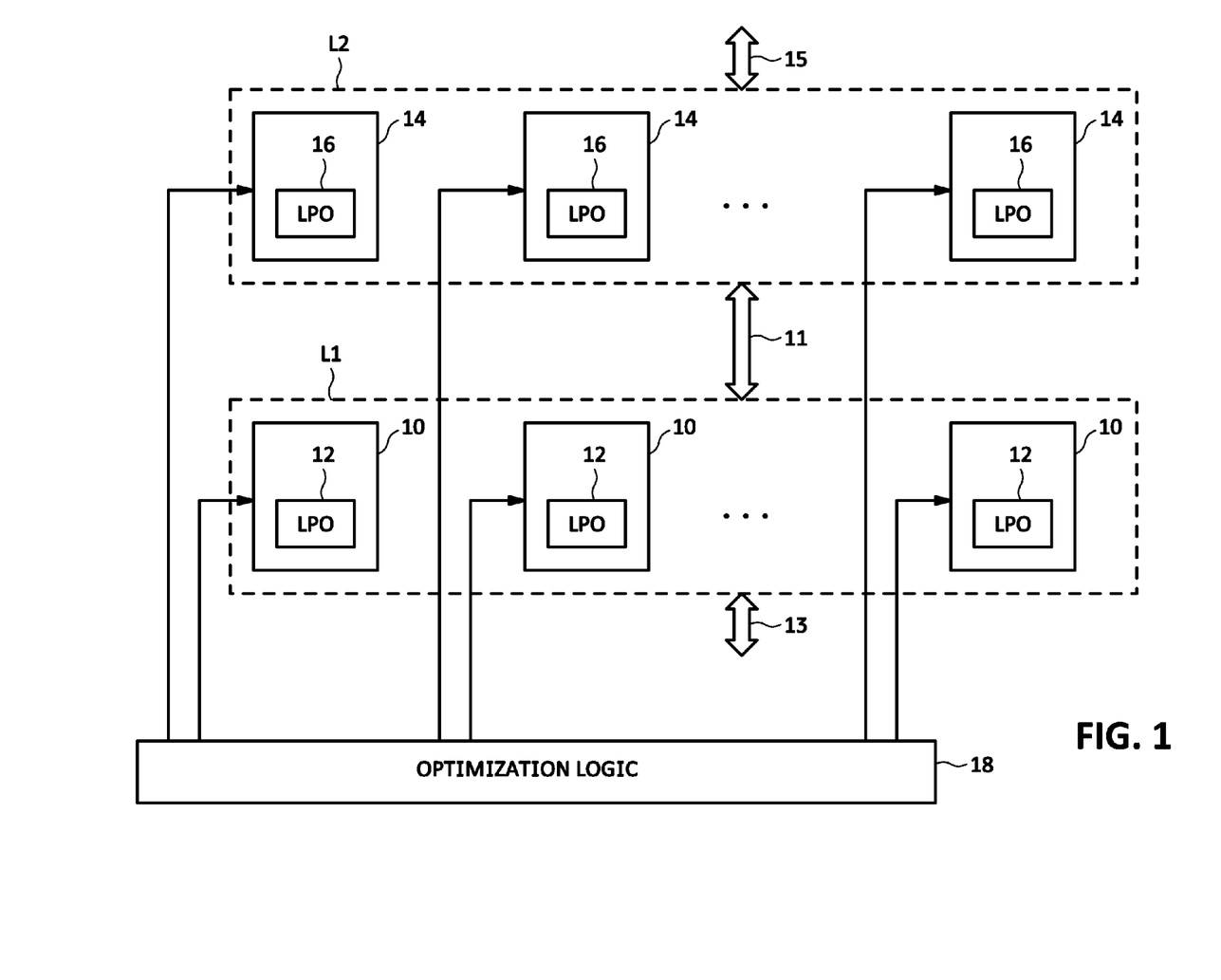
FIG. 1 illustrates a generalized embodiment of a PV system according to some inventive principles of this patent disclosure.

FIG. 1 illustrates a generalized embodiment of a PV system according to some inventive principles of this patent disclosure. The embodiment of FIG. 1 includes one or more first PV components 10 having local power optimization functionality (LPO) 12 to process power at a first level L1. One or more second photovoltaic components 14 process power at a second level L2. The second photovoltaic components 14 may also include local power optimization functionality (LPO) 16. Power may flow in either direction between levels L1 and L2 is shown by arrow 11. Power may also flow in either direction between levels L1 and L2 and any other levels or apparatus that may exist as shown by arrows 13 and 15.

The levels may be implemented with any suitable arrangement of PV apparatus such as cells, strings of cells within a panel, panels, strings of panels, inverters, etc. For example, in some embodiments, the first level may be implemented as a panel level, while the second level is implemented as a centralized inverter level. Another example may include three levels in which cells, panels and inverters each form a level. Thus, the inventive principles are not limited to any specific number or configuration of levels.

The system also includes optimization logic 18 to command one or more of the first photovoltaic components 10 and/or one or more of the second photovoltaic components 14 to accommodate system-level power optimization. The optimization logic may coordinate the operation of the local power optimization functionality of the first and second photovoltaic components. Although shown with two levels, the system may include any number of levels.

When used in the context of a PV component, the term "system-level" refers to any level that is higher or more widespread than the level of the component. For example, a panel-level power optimizer may include remote processing functionality to accommodate system-level optimization. Such system-level optimization may operate on the string level, array level, etc.

In some embodiments, one or more of the components 14, 16, etc., may be capable of reconfiguring themselves to alter their operation as described in more detail below. Thus, the optimization logic 18 may include logic to command any of the photovoltaic components to reconfigure themselves if they are capable.

Figure 2:
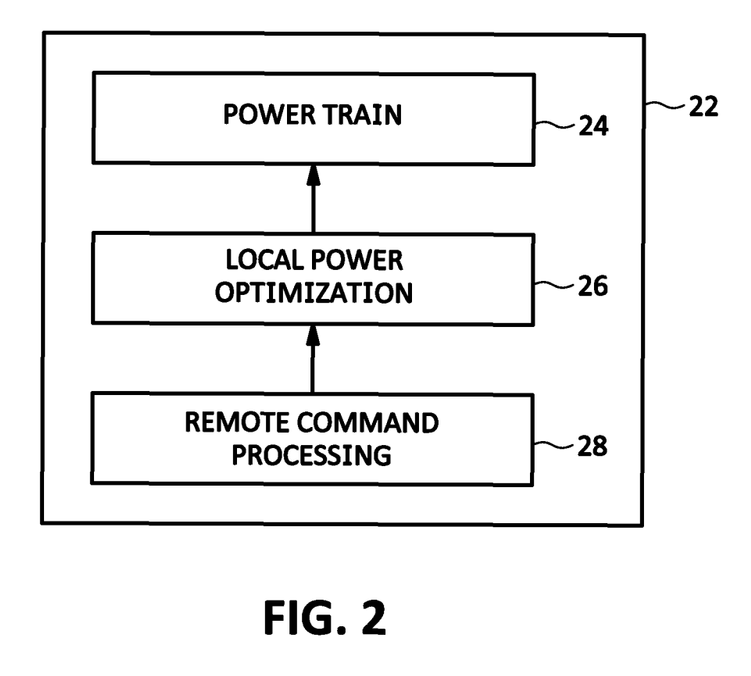
FIG. 2 illustrates a generalized embodiment of a PV component according to some inventive principles of this patent disclosure.

FIG. 2 illustrates a generalized embodiment of a PV component 22 according to some inventive principles of this patent disclosure. The embodiment of FIG. 2 may be suitable for use as any of the PV components shown in FIG. 1 and includes a power train 24, local power optimization functionality 26 arranged to control the power train, and remote command processing functionality 28 to accommodate system-level power optimization. The remote command processing functionality 28 may be adapted to adjust the operation of the local power optimization functionality 26 in response to a remote command from, for example, the optimization logic 18 shown in FIG. 1.

The local power optimization functionality 26 may include local MPPT functionality, and the remote command processing functionality 28 may be adapted to modify the functionality of the local MPPT functionality in response to commands received from, e.g., the optimization logic 18 shown in FIG. 1. For example, the functionality may be modified by adjusting or overriding parameters.

The power train 24 may be reconfigurable. For example, if the PV component is implemented as a cell-level component, the power train may include a bypass device such as a bypass diode or transistor that may be used to bypass a cell having a low output, e.g., because of being shaded, broken, hot, etc. A bypass device may also be used to improve efficiency when no power conditioning is needed. For example, if all of the cells in a panel and/or panels in an array are in good operating condition and subject to the same high level of radiation, e.g., full sunlight, bypass mode may be used for all devices to reduce or eliminate power losses due to local power processing.

Alternatively, the power train may be reconfigurable through one or more switches or an entire switching matrix that enables PV cells, panel sub-strings, panels or strings of panels to be re-connected in series or parallel in response to a remote command.

In some embodiments, the remote command processing functionality 28 may include phase shedding functionality. For example, in an embodiment having multi-phase DC-DC converters, one or more phases may be dropped to reduce control losses when operating lower power levels.

An example of a generalized embodiment of a method for operating a multi-level photovoltaic system according to the inventive principles of this patent disclosure includes: (1) operating a photovoltaic system having a first photovoltaic component to process power at a first level and a second photovoltaic component to process power at a second level, and (2) dynamically configuring at least one of the first and second photovoltaic components. Although described in the context of two levels, a multi-level photovoltaic system according to the inventive principles of this patent disclosure may include any suitable number of levels.

The dynamic configuring may be in response to one or more environmental conditions such as temperature, shading, wind exposure and airflow. The dynamic configuring may also be in response to one or more other system components. For example, the dynamic configuring may occur in response to installation of the one or more other system components, in response to normal operation of the system, and/or to aging of one or more components. As another example, the dynamic configuring may be in response to demand side management commands received from a utility.

In some embodiments, the dynamic configuring may include calculating efficiencies for different configurations, and selecting the most efficient of the different configurations. Some additional examples of dynamic configuring are as follows: bypassing a local power optimizer, overriding the local MPPT functionality of a component, and/or reconnecting one or more components, as between series or parallel connections.

Another example of a generalized embodiment of a method for operating a photovoltaic system according to the inventive principles of this patent disclosure includes: (1) determining an environmental condition of the photovoltaic system, (2) correlating the determined environmental condition to historical measurements of the system, and (3) optimizing the operation of the system in response to the historical measurements.

Optimizing the operation of the system may include calibrating one or more components. In some embodiments, the environmental condition may include a meteorological condition, and the historical measurements may include meteorological data.

The environmental condition may also include a forward-looking meteorological condition, and optimizing the operation of the system may include anticipating a reduction in system power in response to the forward-looking meteorological condition. In such a case, the anticipated reduction in system power may be communicated to the utility that operates the grid to which the PV system may be connected.

Implementation Techniques

The following techniques may be used for implementing the general methods, systems and components described above, but the inventive principles are not limited to these techniques.

According to some inventive principles of this patent disclosure, designing system level monitoring and control into a PV system may enable it to achieve better efficiency and increased power output. The more areas of control that are available to the system, the more possibilities are available for optimization. The following are some example embodiments of hardware and optimizations at various system levels starting with the cell level and working back to the grid. This generally assumes that there is a central control system that has communication with all the parts of the PV system, but the inventive principles are not limited to systems having these conditions.

At the cell level, methods to bypass cells having low output due to shading, breakage, high operating temperature, etc, include the use of bypass diodes and transistors, specifically, FETs. A DC-DC converter may also be used at each cell to improve the capacity for system-level optimization.

At the panel substring level, breaking the panel up into more substrings and performing DC-DC conversion at the substring level may provide finer granularity for shading/mismatch control. The use of local substring DC-DC converters may enable optimization at the panel sub-string or panel level through the use of phase shedding as a function of power handled.

Optimization at the panel sub-string or panel level may also enable the use of full bypass (of the local power optimizers) if the entire system is operable at the maximum efficiency without the local power optimizers. This may occur, for example, if the entire system is operating under close to ideal conditions, e.g., no shadowing, close matching of cells and panels, ideal tilt, significant insolation, etc.

Another potential benefit of the use of optimization at the panel sub-string or panel level is that the output current and voltage may be controlled to optimize the input voltage to a centralized inverter. This may be implemented at the system level to determine the inverter voltages and at what operating point the system is most efficient, taking into account the efficiencies of all the components of the system, e.g., at the panel level, string level and inverter level.

The most efficient operating point may be determined as follows. A system-level unit calculates possible efficiencies and selects the most efficient to set the system to the optimal point. The system level unit maintains a record of historical operating conditions and can infer the ideal shading and temperature variations over time and predict optimal points to avoid large system upsets under changing conditions. The system level unit may also communicate with a database to monitor weather forecasts and seasonal conditions. Under large mismatch conditions, the system level unit can turn off various sub-systems in an attempt to increase the overall power output. It may also monitor panels that have been turned off to determine when to turn them back on.

The system level unit may also use internal shading models to predict when one or more units may be out of large mismatch conditions and producing adequate power again by using data from the operating conditions of previous days. In a situation where a unit is off, the system may periodically turn the unit on to see if it is back to normal. Storing this information as a function of time may also provide information on which to base operations for subsequent days. In units that have a buck or boost feature, the system may tell the unit when to change mode, e.g., use boost mode where a fraction of the strings are subject to heavy shading.

Optimization at the string level may be facilitated with hardware installed in combiner boxes. String level MPPT units may be combined for strings that become heavily shaded (from design software analysis). When the voltage drops on these strings, they may be switched from a parallel string combination to a series string combination. This may allow a simpler buck style design while still providing the advantages of a voltage boosting system. This may also allow more flexibility with the inverter input voltage, thereby allowing the system to run at more optimal points. Moreover, many of the advantages described in the context of optimization at the panel sub-string or panel level may also apply to systems having optimization at the string level. A system level command for operation may be useful, and adaptive phase shedding at this level may also be a useful addition for increased efficiency.

Optimizations at the inverter level may be implemented by controlling the system voltage to take advantage of the inverter maximum efficiency operating points. A variety of typically competing constraints may be accommodated as follows. The maximum bypassed system open circuit voltage (Voc) may need to be under a predetermined limit, e.g., 600V/1000V over the entire operating temperature range. Thus, this constraint may determine the maximum number of panels in a string.

The inverter may also have a minimum input voltage limit. This may set the minimum voltage ratio for a buck converter which, in turn, relates to the total amount of shading a single string can tolerate before dropping out.

The inverter may additionally have an upper limit on the MPP voltage. This essentially may determine the bypass mode, maximum panel MPP voltage for the string.

The above constraints may limit the operating range for the system as well as how much shading can be tolerated. This, in turn, may restrict the range throughout which the system can adjust the system voltage for maximum inverter efficiency, especially under shading conditions. Thus, the inventive principles enable the balancing of tradeoffs between inverter efficiency and losing power from good panels that are located in shaded strings.

According to some additional inventive principles of this patent disclosure, system optimization may also be implemented at the design phase for additional effectiveness. Optimization at the design level may involve an analysis of shading which may be based on an understanding of system shading and what effect it has on performance over daily and annual time frames. Some of the shading related factors that may be considered at the design level may include the following: panel placement which includes position on roof, installation angle, and orientation, choice of per panel power optimizers, string wiring choices, choice of brand of inverter, choice of number and size of inverters, return on investment (ROI) on panels including an in-depth analysis with appropriate software and information.

Optimization at the design level may involve modeling of local heating effects caused by factors including: systems at site such as heating ventilation and air conditioning (HVAC) units, differences in wind exposure, differences in mounting styles, volume of air under panel, air flow under the panel, etc.

Optimization at the design level may further involve an analysis of tilt mismatches including having panels at different tilts that do not match. The use of panel-level power optimizers, however, may correct for tilt mismatches.

Optimization at the design level may further involve an analysis based on system equipment choices. An analysis of the panel choice may include factors such as initial panel cost, panel ROI, and shading and temperature considerations. An analysis of the inverter choice may include factors such as the panel type, temperature variations, component sizing as discussed above, and choice of panel optimizers. An analysis of the power optimizer choice may include factors such as whether a power optimizer provides any additional degrees of freedom in system design that can result in increased efficiency.

Implementation Examples

Figure 3:
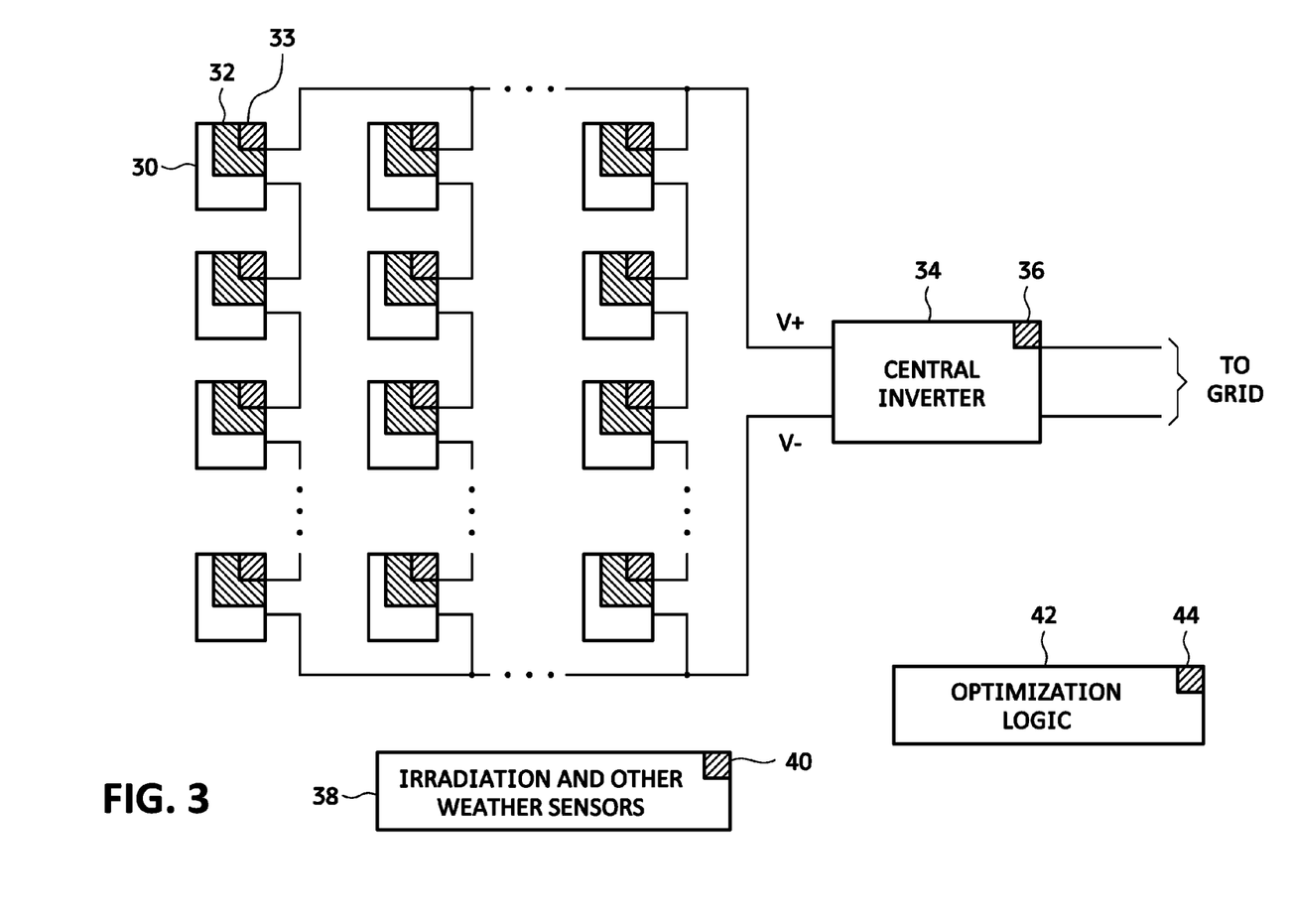
FIG. 3 illustrates an example embodiment of a PV installation according to some inventive principles of this patent disclosure.

FIG. 3 illustrates an example embodiment of a PV installation according to some inventive principles of this patent disclosure. The embodiment of FIG. 3 includes a PV array having strings of series-connected PV panels 30 which, in turn, are connected in parallel to form a DC bus V+,V−. Each of the PV panels 30 includes local power optimization functionality 32 and a local communication module 33. A centralized inverter 34 converts the DC power from the array to AC for feeding to a utility grid. Irradiation and other weather sensors 38 provide real-time meteorological data. Optimization logic 42 provides centralized control for system-level optimization. The inverter, sensors and logic include communication modules 36, 40 and 44, respectively, which may communicate with each other, as well as the communication modules 33 in the PV panels. The communication modules may use any suitable communication medium and protocol.

Figure 4:
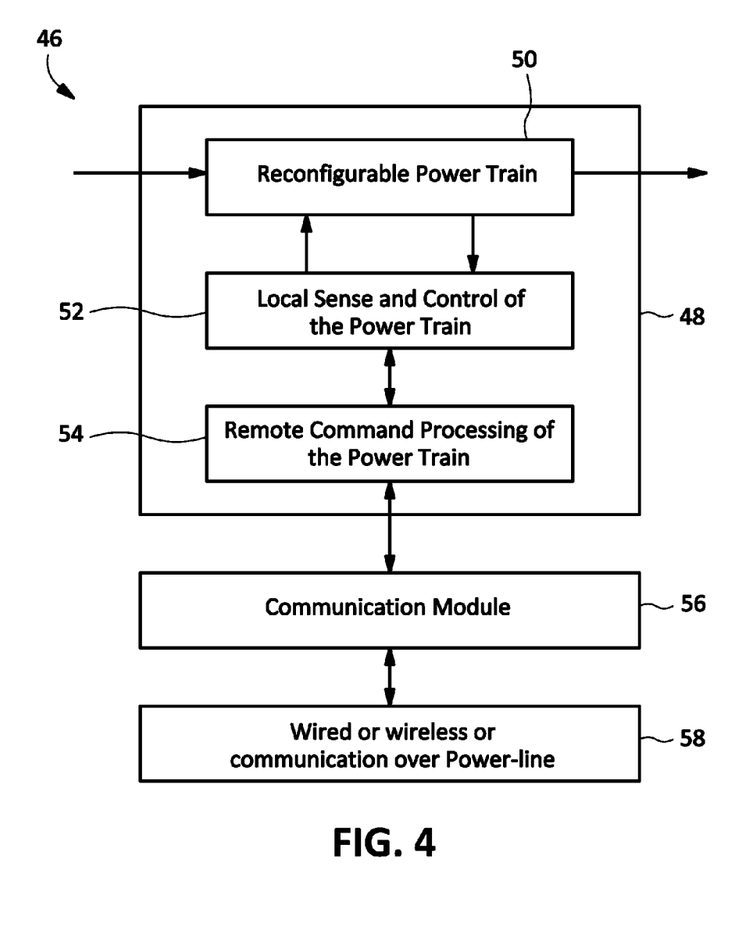
FIG. 4 illustrates an example embodiment of a PV component according to some inventive principles of this patent disclosure.

FIG. 4 illustrates an example embodiment of a PV component 46 suitable for use as one of the PV panels 30 shown in FIG. 3, as well as a string-level or other PV component according to some inventive principles of this patent disclosure. The embodiment of FIG. 4 includes a local panel-level, string-level or other level power optimizer 48 having a power train 50. The power train is reconfigurable such that it operates at maximum efficiency at various power levels. This may be accomplished through various strategies such as phase dropping or switching the converter into a burst mode. The appropriate decision for configuring the power train may be made locally using sense and control circuit 52.

However, as shown in FIG. 4, the communication module 56 may receive remote commands for the optimum configuration of the power train for system-wide optimization of the PV array. Any suitable data transmission medium 58 such as wired, wireless, or power-line communications (PLC) may be used to enable the communication module 56 to communicate with the other system components.

Figure 5:
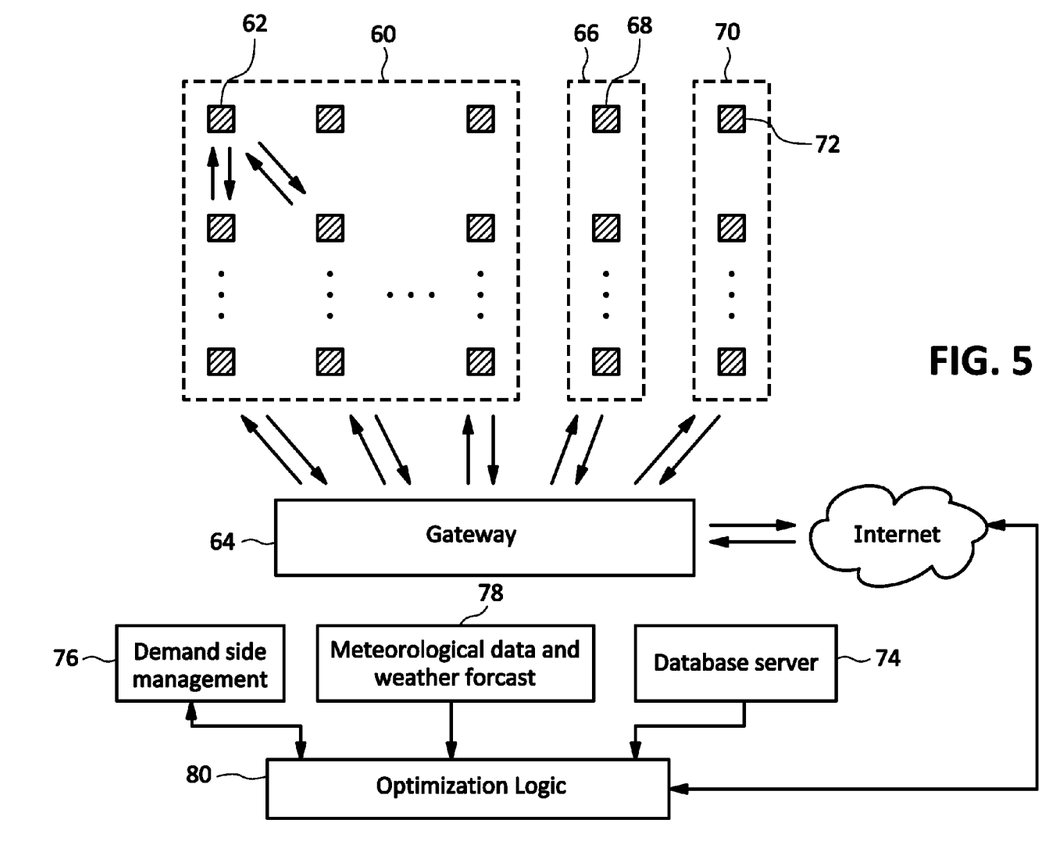
FIG. 5 illustrates an example embodiment of a PV system capable of system-level optimization according to some inventive principles of this patent disclosure.

FIG. 5 illustrates an example embodiment of a PV system capable of system-level optimization according to some inventive principles of this patent disclosure. A PV array 60 may include PV cells and/or strings of cells, PV panels or strings of PV panels, etc., having communication modules 62 arranged for direct or mesh communications through a gateway 64. One or more centralized inverters 66 include communication modules 68 which also communicate through the gateway 64. One or more pyranometers and/or other weather station data sources 70 also include communication modules 72 that communicate through the gateway 64.

Data from the array, inverter(s) and data sources may be transmitted through the Internet or other suitable network and stored on servers 74. The historical data obtained from the data sources along with demand side management information 76 from a smart-grid operator, historical meteorological data and localized weather forecast information 78 may be used to determine the optimum operation of the entire array. This may be accomplished, for example, by using optimization logic 80 such as an intelligent decision engine (or inference engine) running on a relatively high performance remote computer. The computer may implement a decision matrix that may contain optimum configuration information for each of the local power optimizers in the PV array 60, as well as the centralized inverter(s) 66. The optimum configuration information may be updated continuously to enable an intelligent PV array coordinating system to continuously operate at the optimum overall efficiency.

In the embodiment of FIG. 5, the optimization logic is remote from the PV components, that is, the optimization logic is not embedded in any of the PV components. For example, the database server 74 may be off-site from the array. Thus, the optimization logic may determine operating points or modifications to the parameters of one or more local power optimizers, or configuration information for some or all of the PV components, then send the operating points, parameters or configuration data back to the components through the gateway or other communication arrangement.

Figure 6:
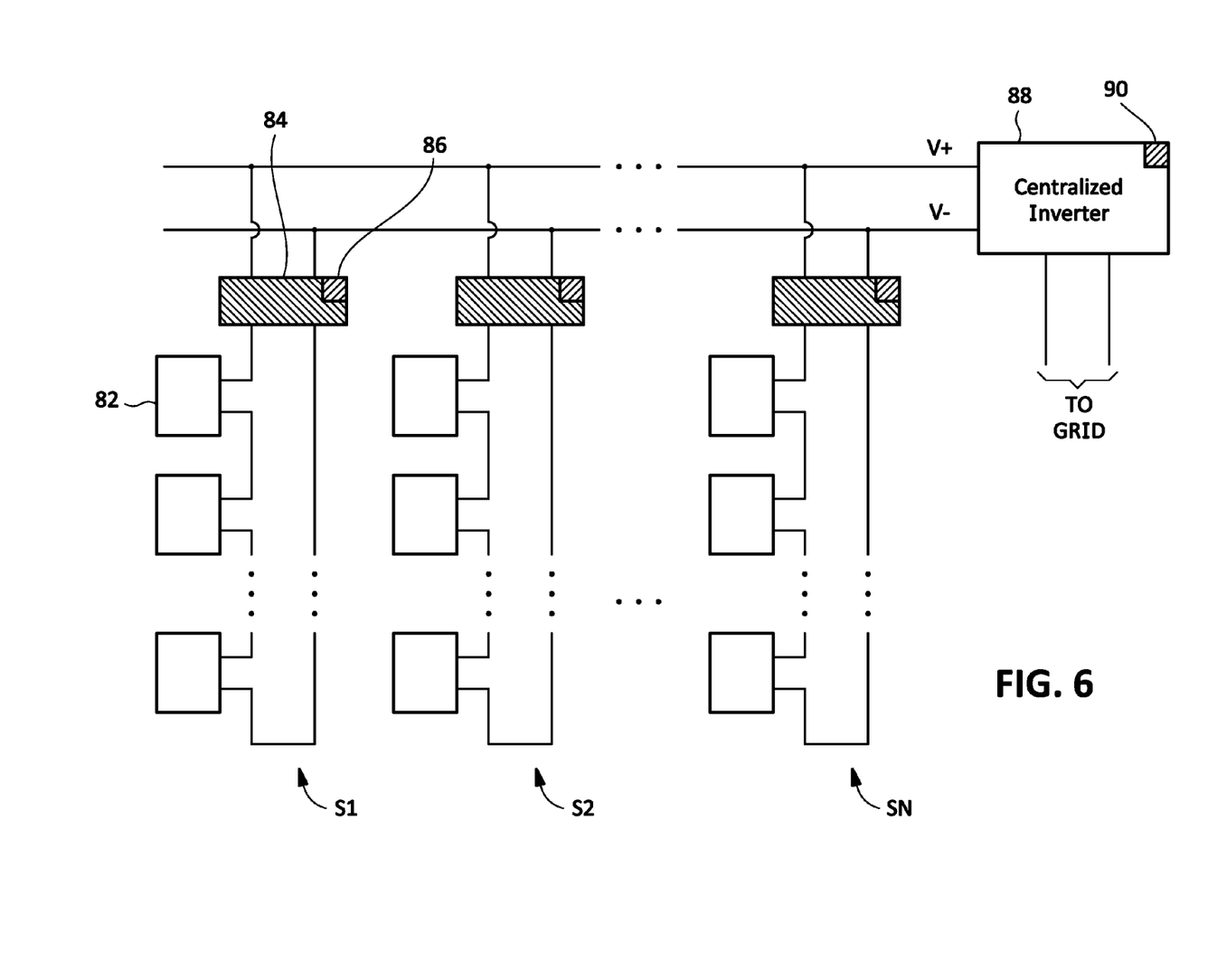
FIG. 6 illustrates an example embodiment of a PV system using string-level power optimizers to implement system-level optimization according to some inventive principles of this patent disclosure.

FIG. 6 illustrates an example embodiment of a PV system using string-level power optimizers to implement system-level optimization according to some inventive principles of this patent disclosure. The embodiment of FIG. 6 may be used to implement, for example, the array 60 and inverter(s) 66 shown in FIG. 5. In the embodiment of FIG. 6, PV panels 82 are arranged in series-connected strings S1, S2, ... SN, each of which is interfaced to a DC bus V+,V− through a local power optimizer 84. Each of the local power optimizers includes a communication module 86. A centralized inverter 88 also includes a communication module 90.

Figure 7:
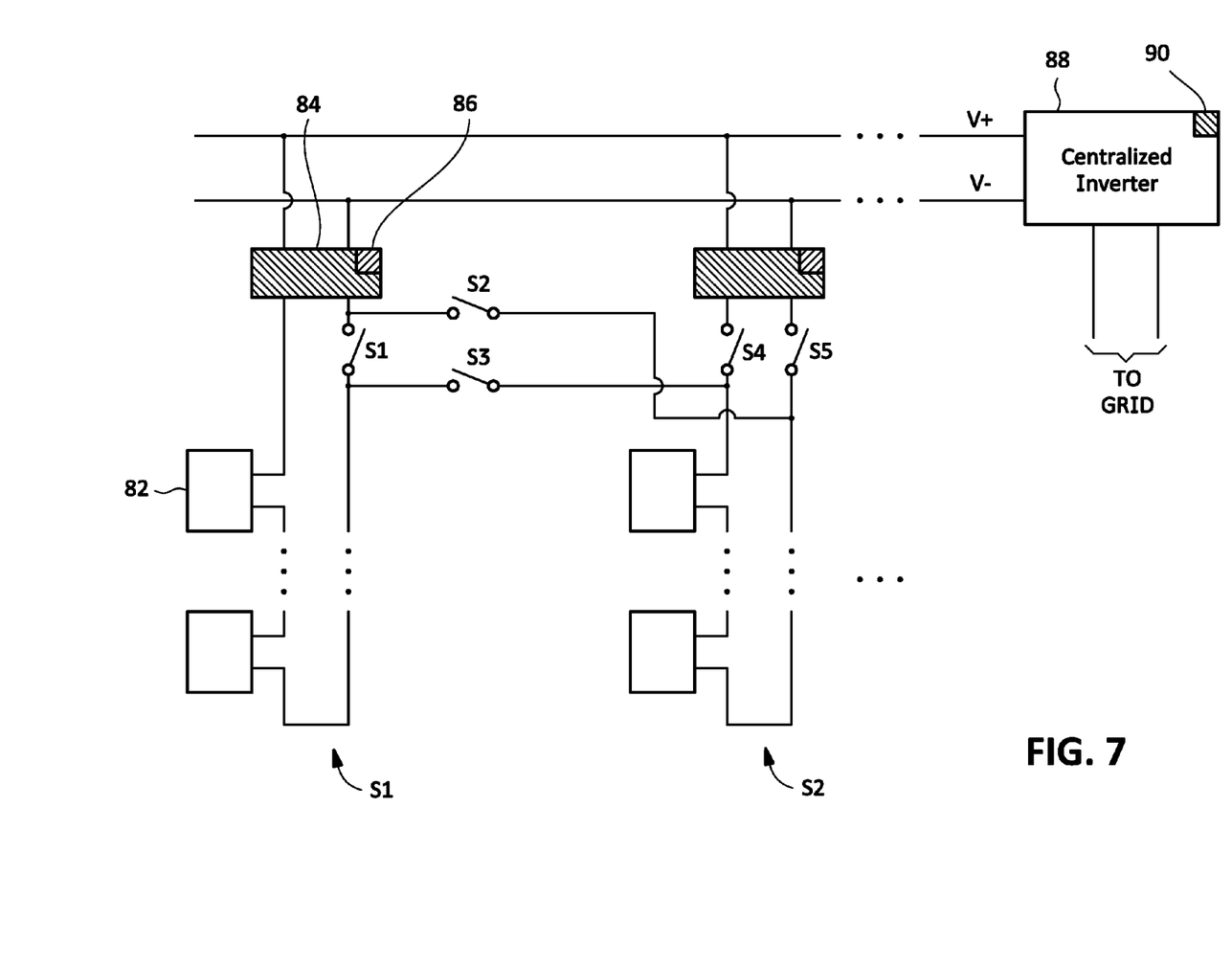
FIG. 7 illustrates another example embodiment of a PV system using string-level power optimizers to implement system-level optimization according to some inventive principles of this patent disclosure.

FIG. 7 illustrates another example embodiment of a PV system using string-level power optimizers to implement system-level optimization according to some inventive principles of this patent disclosure. The embodiment of FIG. 7 is similar to the embodiment of FIG. 6, but an array of smart switches S1-S5 enable the strings to be re-connected in series or parallel configurations to accommodate a wider variety of operating conditions, especially non-ideal conditions. For example, the strings may normally be configured for parallel operation under near-ideal irradiation and other weather conditions. If any of the panels and/or strings become shadowed, broken, aged, or otherwise have a reduced power output, the strings may be re-connected in series to maintain a minimum output voltage level. This may be beneficial, for example, if the centralized inverter 88 requires a minimum input voltage to maintain a high level of efficiency.

The smart switches S1-S5 may be triggered, for example, by remote commands that are transmitted to the local communication module 86 from centralized optimization logic.

Figure 8:
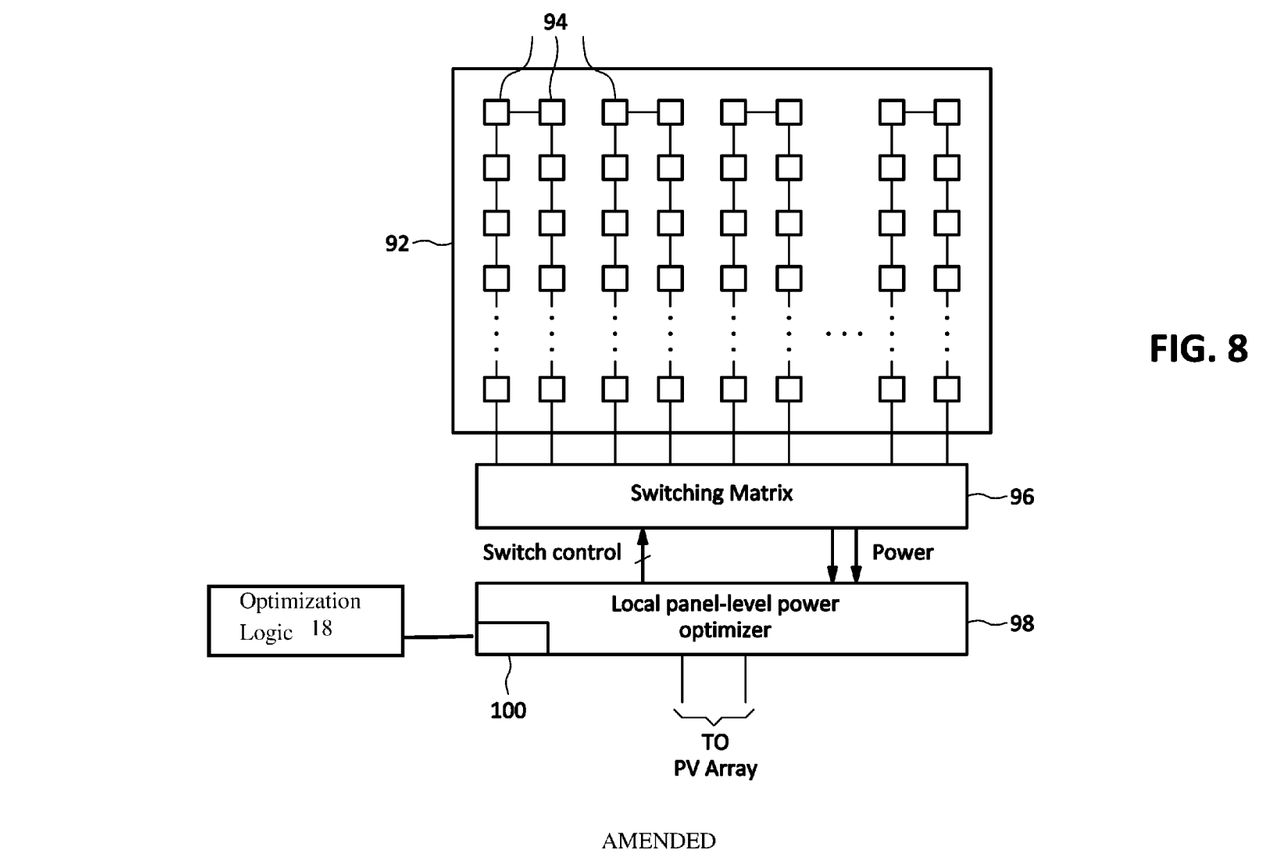
FIG. 8 illustrates an example embodiment of a PV panel having sub-strings that can be reconfigured according to some inventive principles of this patent disclosure.

FIG. 8 illustrates an example embodiment of a PV panel having sub-strings that can be reconfigured for increasing the efficiency of a PV array under non-ideal conditions according to some inventive principles of this patent disclosure. The embodiment of FIG. 8 includes a PV panel 92 having strings 94 of PV cells that can be re-connected in any parallel/series combination through switching matrix 96. A local power optimizer 98 includes a communication module 100 to receive commands from centralized control logic to enable the power optimizer to control the switching matrix. In some embodiments, the switching matrix and local power optimizer may be embedded directly inside the PV panel. The PV panel illustrated in FIG. 8 may itself be connected to the rest of a PV array in series or parallel, or it may be flexibly reconnected with additional switches as shown in FIG. 7.

Additional Implementation Techniques

An additional implementation technique according to some inventive principles of this patent disclosure involves the correlation of the entire historical measurements of the array (which may include all local MPPT device measurements, as well as central inverter data measurements) to the granular solar irradiation and temperature measurements available at on-site weather stations. This may allow optimum operation of the entire PV array at the currently measured weather conditions. In addition, the correlation can take into consideration calendar-based time frames such as day of the year, season, month, etc. Measuring granular solar irradiation and temperature may act as a reference for the calibration of each of the panels, as well as local MPPT devices and a centralized inverter.

According to some additional inventive principles of this patent disclosure, if an MPPT device's power train is designed to be scalable, it may be possible to re-configure the MPPT device to the specific brand, wattage, etc. of panels to be used at the installation site through the communication capabilities built into the system. Thus, the power-train may not need to be designed for a specific wattage. Having an appropriately scaled power train may allow optimum match of the MPPT device to the panel, thus providing most optimum efficiency. Furthermore, cellular efficiency enhancements such as phase dropping under reduced irradiation from the rated conditions may be accomplished through the use of pre-determined tables which may be loaded into the MPPT module, or which may be served by the centralized server based on optimally determined weather and time-of-year conditions.

Some additional implementation techniques according to the inventive principles of this patent disclosure relate to the reconfigurable power train architecture allowing on-site configuration of the local power optimizer for optimum efficiency by allowing matching to the specific solar panel being installed through the communication capability, thus simplifying inventory management as well as manufacturing logistics. If the local power optimizer is embedded within the solar panel, this can be accomplished by configuring the module during solar panel integration.

Some additional implementation techniques according to the inventive principles of this patent disclosure relate to the aging of components. MPPT devices and/or a central inverter may undergo drastic perturbations over multiple years of operation during which their efficiency curves may change erratically and may significantly vary from one module to another. In addition, they may periodically see varied temperatures, increased panel mismatch, increased module-to-module mismatch, etc. Correlating this information to the irradiation data (including possibly temperature, and time-of-year) may enable dynamic determination of newer operating framework to be loaded into the MPPT modules or served by the centralized server through the communication capabilities.

Any of these additional inventive techniques may be applied to systems that utilize micro-inverters to replace DC wiring with AC wiring. These additional inventive techniques may also be applied to module sub-string as well as individual cell levels of abstraction.

As used herein, the term functionality includes some structure. For example, in some embodiments, monitoring functionality may be realized with an all-hardware implementation that includes digital and/or analog hardware. In other embodiments, the monitoring functionality may essentially be realized as a software solution, but such an implementation still includes a hardware platform on which the software runs.

The inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A photovoltaic component comprising:
    a first power train;
    local power optimization functionality configured to control the first power train; and
    remote command processing functionality adapted to receive a remote command locally at the photovoltaic component to accommodate active ongoing system-level photovoltaic panel power optimization for a photovoltaic system, by adjusting an operation of the local power optimization functionality, the adjustment instructed by the received remote command and serving to move operation of the first power train away from maximum power point operation of the first power train,
    wherein the first power train is connected to a second power train of a separate photovoltaic panel with switches such that the first power train and the second power train are switchable to be connected in series with each other or connected in parallel with each other depending upon the positions of the switches,
    wherein system-level photovoltaic panel power optimization comprises centralized power optimization for the photovoltaic system, and
    wherein the first power train, the second power train and the separate photovoltaic panel belong to the photovoltaic system.

2. The photovoltaic component of claim 1 where the remote command processing functionality is adapted to adjust the operation of the local power optimization functionality in response to the remote command, the remote command sent from a photovoltaic system-level optimization logic.

3. The photovoltaic component of claim 2 where:
    the local power optimization functionality includes local MPPT functionality; and
    the remote command processing functionality is adapted to modify the local MPPT functionality.

4. The photovoltaic component of claim 1 further comprising:
    a module in communication with a unit maintaining a record of historical operating conditions and the unit configured to predict optimal points under changing environmental power generation conditions.

5. The photovoltaic component of claim 4 where the first power train includes a bypass device and where the unit is in communication with a database storing weather forecasts or seasonal power generation conditions or both.

6. The photovoltaic component of claim 4 where the unit is configured to employ shading models to predict large shading mismatch conditions.

7. The photovoltaic component of claim 1 further comprising functionality configured to turn on the first power train when previously determined mismatch conditions have ceased.

8. The photovoltaic component of claim 1 where the remote command processing functionality includes phase shedding functionality and wherein when a voltage drop is detected the connection between the first power train and a second power train is changed from a parallel connection to a series connection.

9. The photovoltaic component of claim 5, wherein the bypass device is placed in a bypass mode by the local power optimization functionality.

10. The photovoltaic component of claim 1, wherein the remote command processing functionality is further adapted to configure the photovoltaic component into a bypass mode.

11. The photovoltaic component of claim 1, wherein the first power train is connected to the second power train of a second photovoltaic panel with switches such that, the first power train and a first photovoltaic panel or a first string of photovoltaic panels, and the second power train and the second photovoltaic panel or a second string of photovoltaic panels, are switchable between series and parallel connections with each other depending upon the positions of the switches.

12. A method of operating a photovoltaic component, the method comprising:
    receiving a remote command at a remote command processing functionality within the photovoltaic component of a first photovoltaic panel or a first string of photovoltaic panels;
    adjusting an operation of a local power optimization functionality to move away from a local maximum power point of the photovoltaic component in response to the remote command provided by the remote command processing functionality;
    controlling a power train according to the operation of the local power optimization functionality; and
    switching from a parallel connection between the photovoltaic component of a first photovoltaic panel or a first string of photovoltaic panels and another photovoltaic component a second photovoltaic panel or a second string of photovoltaic panels to a series connection between the photovoltaic component of the first photovoltaic panel or a first string of photovoltaic panels and another photovoltaic component of the second photovoltaic panel or a second string of photovoltaic panels,
wherein the remote command is generated by a system management component to promote operation of a central system component at a maximum power point for the system.

13. The method of claim 12 wherein the remote command is generated by a system management component to promote operation of a central inverter at a maximum power point for the central inverter.

14. The method of claim 12,
wherein the receiving step includes receiving the remote command from an optimization logic, and
wherein the remote command is generated by a system management component to promote operation of a central inverter at a maximum power point for the central inverter and promote local power optimization of the first photovoltaic panel to be moved away from a local maximum power point for the first photovoltaic panel.

15. The method of claim 12, further comprising reconfiguring the power train using the local power optimization functionality in response to the remote command received by the remote command processing functionality, the reconfiguring including one or more of the following: bypassing a local power optimizer and overriding local maximum power point functionality of the photovoltaic component.

16. The method of claim 12 further comprising:
determining an environmental condition of a system in which the photovoltaic is a part of:
correlating the determined environmental condition to historical measurements of the system; and
optimizing the operation of the system in response to the historical measurements.

17. A photovoltaic component comprising:
a first power train;
local power optimization functionality arranged to control the first power train; and
remote command processing functionality adapted to receive a remote command locally at the photovoltaic component to accommodate system-level photovoltaic panel power optimization by adjusting an operation of the local power optimization functionality,
wherein the first power train is connected to a second power train of a separate photovoltaic panel with switches such that the first power train and the second power train are switchable to be connected in series with each other or connected in parallel with each other depending upon the positions of the switches,
wherein the switches are controlled by optimization logic configured to dynamically provide for connecting, back and forth, the first power train and the second power train either in series or in parallel with each other.

* * * * *